United States Patent [19]

Logan et al.

[11] 3,921,674

[45] Nov. 25, 1975

[54] HOSE CONSTRUCTION AND METHOD OF MAKING SAME

[75] Inventors: Arthur D. Logan; James B. Rush, both of Waynesville, N.C.

[73] Assignee: Dayco Corporation, Dayton, Ohio

[22] Filed: Mar. 18, 1974

[21] Appl. No.: 452,471

[52] U.S. Cl. .................. 138/130; 138/132; 138/138
[51] Int. Cl.² .......................................... F16L 11/08
[58] Field of Search ........................... 138/129–130, 138/132–133, 137–138, 177, DIG. 2

[56] References Cited
UNITED STATES PATENTS

| | | | |
|---|---|---|---|
| 1,394,300 | 10/1921 | Gammeter | 138/133 |
| 1,601,092 | 9/1926 | Weigel | 138/133 |
| 3,013,921 | 12/1961 | Jacobson | 138/129 X |
| 3,117,597 | 1/1964 | Fritz et al. | 138/132 X |
| 3,242,691 | 3/1966 | Robinson et al. | 138/138 X |
| 3,312,250 | 4/1967 | Sirigano | 138/129 X |
| 3,502,113 | 3/1970 | Bjorksten | 138/129 |
| 3,561,493 | 2/1971 | Maillard et al. | 138/137 X |
| 3,598,126 | 8/1971 | Holltzenbein | 138/177 X |
| 3,642,034 | 2/1972 | Ullman et al. | 138/129 X |
| 3,646,610 | 2/1972 | Jackson | 138/129 X |

Primary Examiner—Richard C. Queisser
Assistant Examiner—Charles Gorenstein
Attorney, Agent, or Firm—Reuben Wolk

[57] ABSTRACT

A hose construction and method of making same are provided and the hose construction includes an inner layer portion made primarily of an elastomeric material and another layer portion bonded against the inner layer portion and cured therewith as an integral part thereof with the outer layer portion being made of an elastomeric matrix compound having elongated fibers embedded therein in substantially parallel relation with the fibers extending in a helical pattern about a central longitudinal axis of the hose construction and with a predetermined angular relationship relative thereto.

13 Claims, 10 Drawing Figures

HOSE CONSTRUCTION AND METHOD OF MAKING SAME

BACKGROUND OF THE INVENTION

There are numerous applications in industry which utilize hose constructions made primarily of elastomeric materials; and, in applications which are considered of comparatively low pressure, i.e., generally of the order of 100 psig or less, each hose construction is usually made of three main components in the form of a base tube which is used to contain a working fluid, a reinforcement which is used to provide the hose with dimensional stability and increase the strength thereof against bursting pressures, and a cover component to protect the reinforcement and base tube against mechanical damage and/or chemical attack.

In previously proposed low pressure hose constructions of the type used for automobile radiators, and the like, it is usually necessary to laminate or otherwise apply an elastomeric base tube on an associated mandrel, apply a reinforcement over the base tube by knitting, wrapping, or braiding, or the like, to define an assembly, followed by extrusion or lamination of a suitable elastomeric protective cover over the assembly, and finally curing the assembly whereby it is necessary with present hose constructions to go through numerous comparatively expensive steps and utilize special equipment in order to produce a comparatively simple hose construction thereby resulting in substantially increasing the cost of such a hose construction.

SUMMARY

This invention provides a simple and economical hose construction and method of making same which results in reduced material costs inasmuch as several reinforcing elements usually provided in previously proposed hose constructions are not required, reduced labor costs inasmuch as a major step usually required in applying reinforcement means is eliminated, and the provision of a hose construction which lends itself to high volume production and automation. The hose construction of this invention has a reference axis and comprises an inner layer portion made primarily of an elastomeric material and another layer portion bonded against the inner layer portion and cured therewith as an integral part thereof with the other layer portion being made of an elastomeric matrix compound having elongated fibers embedded therein in substantially parallel relation with the fibers extending in a helical pattern about the axis with a predetermined angular relationship relative thereto and providing reinforcement for said hose construction.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
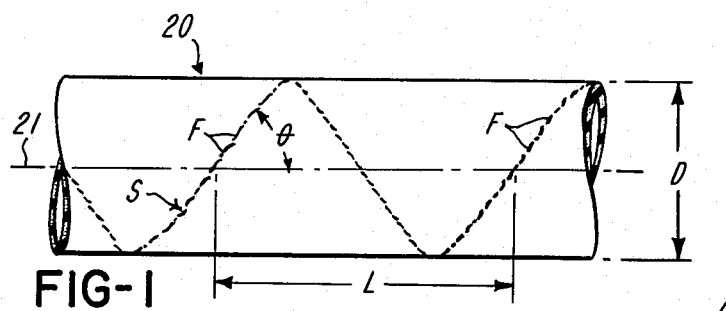
FIG. 1 is a schematic presentation of one exemplary embodiment of the hose construction of this invention particularly illustrating reinforcing means in the form of one set of a plurality of elongated fibers arranged in end-to-end aligned relation in a helical pattern about a hose construction to define what may be considered a single strand with the strand being arranged at an angle $\theta$ relative to a longitudinal axis through the hose construction.

To facilitate an understanding of the present invention the following presentation is made of theoretical considerations in elastomeric hose design followed by various exemplary embodiments of the hose construction and method of making same.

In particular, the pressure acting in an elongated hose construction arranged with its longitudinal axis extending horizontally may be resolved into two principal components, a horizontal force or end thrust and a vertical force or hoop stress.

The horizontal force may be expressed by the formula:

$$H = \frac{P \times H \times D^2}{4} \qquad \text{Equation 1}$$

The vertical force may be expressed by the formula:

$$V = \frac{P \times D \times L}{2} \qquad \text{Equation 2}$$

Where:
H = horizontal force
V = vertical force
P = internal pressure
D = diameter of hose In reinforced hose constructions, it has been found that the most effective use of reinforcing material, whether in the form of wire, fabric, etc., is obtained when the load-bearing elements of the reinforcing material are aligned parallel with the forces acting in the hose wall when pressure is applied. In general, the resultant R of the vertical V and horizontal H components of forces due to internal pressure can be represented by the resultant R on a parallelogram of forces commonly employed in physics wherein the vertical force V is represented as a line starting from a fixed point and extends vertically, the horizontal force H is represented as a line which extends horizontally from such fixed point, and the resultant R extends from such fixed point as a diagonal line of the parallelogram at an included angle, which will be referred to as angle $\theta$, between the horizontal line H and the resultant R. Accordingly, a relationship may be expressed between the vertical force V and the horizontal force H by the equation:

$$\text{Tan } \theta = \frac{V}{H} \qquad \text{Equation 3}$$

It is therefore apparent that each reinforcing element in the wall of an ideal hose construction should be arranged to lie parallel with the resultant R, and this means that each must be arranged at an angle $\theta$ relative to central horizontal axis of the hose construction. To emphasize this concept, reference is now made to FIG. 1 of the drawings where what will be referred to as a single strand S of reinforcing material is shown schematically as such a strand S would be ideally arranged in an exemplary hose construction 20 of this invention. The strand S is comprised of a plurality of aligned end-to-end fibers F which extend in a helical pattern about the hose construction 20 and although as a practical matter the fibers F would probably not be arranged in precise end-to-end relation as shown, such fibers would be sufficiently aligned that they would be in substantially end-to-end relation in a very large number of sets of fibers as are present in the hose construction of this invention. It will also be appreciated that a more conventional reinforcing element or material, such as a wire, fabric, or the like would also be similarly arranged as the strand S.

Figure 2:
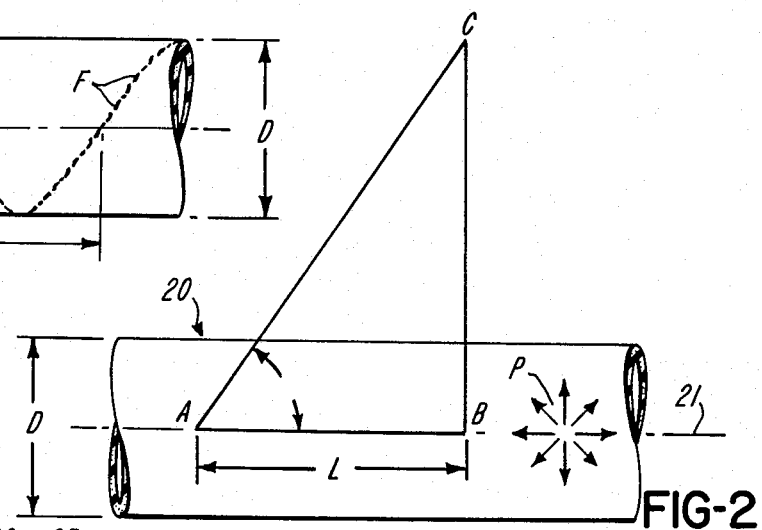
FIG. 2 is a presentation of the reinforcing strand of FIG. 1 in a planar diagram.

The reinforcing strand S of FIG. 1 is arranged in a helical pattern having a pitch length L and extends at an angle $\theta$ relative to the axis; and, such reinforcing strand may be represented in a planar diagram as shown in FIG. 2 wherein:
P = internal pressure
L = pitch length of reinforcing strand S
AC = length of strand in one pitch
BC = circumference of the hose construction
From FIG. 2 it is apparent that $$\text{Tan } \theta = \frac{BC}{AB} = \frac{\text{circumference}}{\text{pitch}} = \frac{\Pi D}{L} \qquad \text{Equation 4}$$

Equation 4 may be rearranged and expressed:

$$L = \frac{\Pi D}{\text{Tan } \theta} \qquad \text{Equation 5}$$

However, from Equation 3, it is seen that:
Tan $\theta$ = V/H and the values for H and V are given in Equations 1 and 2 respectively so that upon substituting Equations 1 and 2 in Tan $\theta$ = V/H the following equation is obtained:

$$\text{Tan } \theta = \left[\frac{P \times D \times L}{2}\right] \div \left[\frac{P \times \Pi \times D^2}{4}\right]$$

which may be rearranged to:

$$\text{Tan } \theta = \frac{4 \times P \times D \times L}{2 \times P \times \Pi \times D^2} \text{ which simplifies to:}$$

$$\text{Tan } \theta = \frac{2L}{\Pi D} \qquad \text{Equation 6}$$

However, the value of L is known from Equation 5 above and substituting this value of L into Equation 6 gives:

$$\text{Tan } \theta = 2 \left[\frac{\Pi D}{\text{Tan } \theta}\right] \div \Pi D \text{ which may be}$$

rearranged to:

$$\text{Tan } \theta = \frac{2 \Pi D}{\Pi D \text{ Tan } \theta} \text{ which simplifies to:}$$

$$\text{Tan } \theta = \frac{2}{\text{Tan } \theta} \text{ or Tan}^2 \theta = 2 \qquad \text{Equation 7}$$

Equation 7 may be written:
Tan $\theta = \sqrt{2} = 1.414$     Equation 8

From which:
$\theta = 54° 44'$

This angle $\theta$ of 54° 44' may be called the "neutral angle" and is the optimum angle at which any reinforcing means should be arranged relative to the longitudinal axis such as axis 21 of hose construction 20. The angle $\theta$ is independent of hose dimensions or internal pressure; and, in any hose construction the reinforcing elements should be applied at or close to this angle in order to obtain highest burst strength and good stability under pressure. However, it will be appreciated that it is not always practical to apply the reinforcing means at this exact angle especially with hose constructions having a plurality of layers or plies whereby acceptable results may be obtained applying the reinforcing means at an angle ranging between 50° and 60°.

In the preceding discussion, attention was given to hoop stress and end thrust only at one end of the hose construction. In actual practice, a second ply or layer portion of reinforcing elements is generally necessary to counteract the resultant of hoop stress and end thrust on the opposite end of the hose construction. The second ply or layer portion may be of any suitable known construction or may be similar to the first-named ply or layer portion while being arranged in an opposite sense to the first and this latter type of hose construction will be discussed in more detail in connection with the more detailed illustration of the hose construction 20 presented in FIG. 3.

Figure 3:
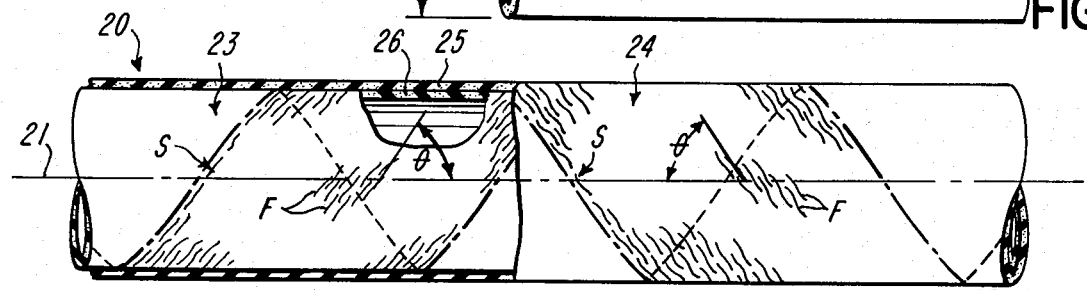
FIG. 3 is a view with parts in elevation, parts in cross section, and parts broken away particularly illustrating one exemplary embodiment of the hose construction of this invention.

As seen in FIG. 3, the exemplary hose construction 20 has its reference axis 21 as its central longitudinal axis and has what may be considered an inner layer portion 23 made primarily of an elastomeric material and another outer layer portion 24 bonded against the inner layer portion 23 and cured therewith as an integral part thereof. The outer layer portion 24 is made of an elastomeric matrix compound 25 having elongated fibers F embedded therein in substantially parallel relation with the fibers extending in a helical pattern about the axis 21 and with a predetermined angular relationship relative thereto or angle θ therebetween which as previously explained is preferably 54° and 44' and which from a practical view may be considered an angle of 55°. The inner layer portion 23 is also made of an elastomeric matrix compound 26 having elongated fibers also designated by the letter F embedded therein in substantially parallel relation with the fibers F of the inner layer 23 also extending in a helical pattern about the axis 21 with a predetermined angular relationship relative thereto or angle θ therebetween which is also preferably 54° and 44' and as before is considered an angle of 55°.

The helical pattern of the fibers F of the inner layer portion 23 extend in a direction opposite from the helical pattern of the fibers F of the outer layer portion 24. In particular, it will be seen from the illustration of FIG. 3 that the fibers F of the outer portion 24 may be considered as extending in a clockwise helical pattern when viewed from the left end of the hose construction 20 while the fibers F of the inner portion 23 may be considered as extending in a counterclockwise pattern when viewed from the same end.

The hose construction 20 eliminates reinforcing means provided in similar hose constructions provided heretofore in that the hose construction 20 is made up of two basic layer portions, namely portions 23 and 24, and each portion 23 and 24 has reinforcing means in the form of reinforcing fibers F embedded in its associated elastomeric matrix 26 and 25 respectively as an integral part thereof. In particular, the fibers F of each portion are oriented with respect to the longitudinal axis 21 of the hose construction 20 so that the composite of fibers and associated matrix exhibit a high Young's modulus and "mechanical anisotropy." The phrase "mechanical anisotropy" is intended to mean that the tensile modulus in the direction of fiber orientation is much higher than the tensile modulus in a direction transverse to the fiber orientation such as at right angles thereto, for example.

The fiber orientation of fibers F in the hose construction 20 is suitably obtained by the unique method of this invention and in a manner which will be described in more detail subsequently but in any event it will be appreciated that the fibers F of the inner layer portion 23 extend in parallel relation and essentially end-to-end so that groups or sets of aligned fibers may be and are obtained. Each set of aligned fibers may be considered as a strand similar to the strand S previously described and shown in FIG. 1. Therefore, and as explained before, each strand S comprised of a large number of end-to-end fibers F is arranged at an angle θ generally of the order of 55° with the central longitudinal axis 21. The fibers F of the outer layer portion 24 are similarly arranged to define what may be considered strands S at the opposite helix angle, as previously mentioned, and the strands are similarly arranged at an angle θ generally of the order of 55° with respect to the central longitudinal axis 21.

The fibers F of the layer portions 24 and 23 are arranged with oppositely wound helix lead angles, i.e., clockwise and counterclockwise respectively, whereby portions 23 and 24 cooperate and provide the hose construction 20 with optimum burst strength and a dimensional stability which was only possible heretofore with a much more expensive hose construction.

The matrix compound 25 used to define portion 24 and the matrix compound 26 used to define portion 23 may be the same or different elastomers and in applications where they are different, they should be compatible so that they may be readily bonded together upon curing of the hose construction. Further, it will be appreciated that each elastomeric matrix material or compound should be such that the fibers F dispersed therethrough are bonded in a tenacious manner so that the compound and fibers form a composite or matrix-like mass having controllable and determinable properties.

Any suitable material or matrix compound may be utilized to define the matrix compound 26 of the inner layer 23 and for applications such as for automotive radiator applications such an elastomeric material is selected so that it has a comparatively high oil and heat resistance. One compound that has been used successfully is an acrylo-nitrile butadiene rubber and is popularly referred to as NBR. Similarly, the matrix material for the layer 24 is preferably selected so that it has a high heat and ozone resistance and one compound which has been used successfully for this purpose is a compound of an ethylene propylene diene terpolymer which is popularly referred to as EPDM.

Figure 4:
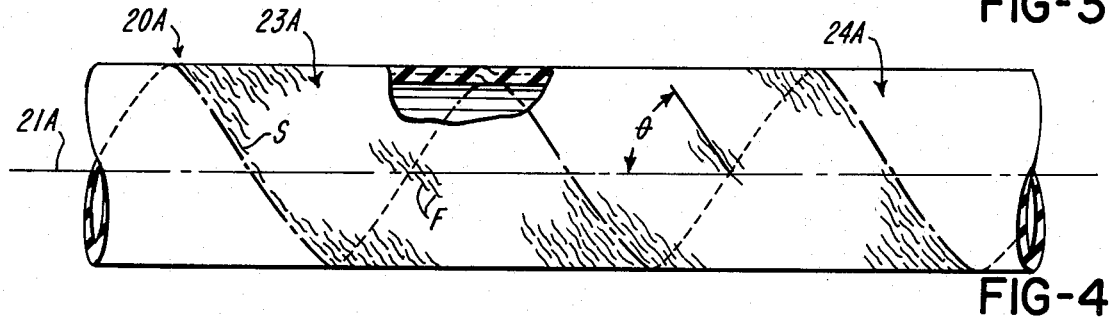
FIG. 4 is a view similar to FIG. 3 illustrating another exemplary embodiment of the hose construction of this invention.
Figure 5:
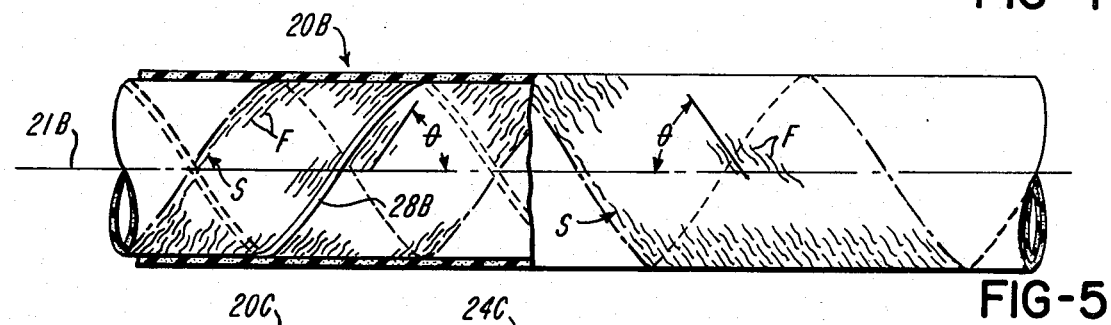
FIG. 5 is a view similar to FIG. 3 illustrating another exemplary embodiment of a hose construction like the construction of FIG. 3 which also has a helically wound reinforcing wire provided as an integral part thereof.
Figure 6:
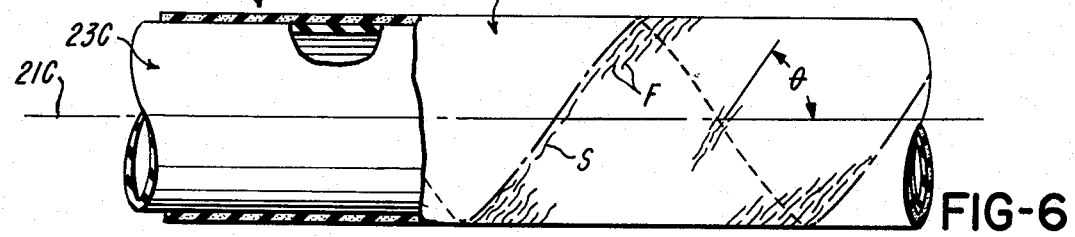
FIG. 6 is a view similar to FIG. 3 illustrating another exemplary embodiment of the hose construction of this invention.

Other exemplary embodiments of the hose constructions of this invention are illustrated in FIGS. 4, 5, and 6. The hose constructions illustrated in FIGS. 4, 5, and 6 are similar to the hose construction 20; therefore, such hose constructions will be designated by the reference numerals 20A, 20B and 20C respectively and representative parts of each hose construction which are similar to corresponding parts of the hose construction 20 will be designated in the drawings by the same reference numeral as in the hose construction 20 (whether or not such components are mentioned in the specification) followed by an associated letter designation, either A, B or C and not described again in detail. Only those component parts of each hose construction which are substantially different from corresponding parts of the hose construction 20 will be designated by a new reference numeral also followed by the associated letter designation and described in detail.

The hose construction 20A of FIG. 4 is also comprised of an inner layer portion 23A and a layer portion 24A and it will be seen that the portions 23A and 24A each have fibers F extending so that the fibers of each layer are arranged in strands S of the character previously defined and all of the strands S extend at substantially the same helix angle θ generally of the order of 55° with the longitudinal axis 21A.

The hose construction 20B of FIG. 5 is substantially identical to the hose construction 20 with the exception that it has an inextensible elongated strength member 28B bonded between the layers 23B and 24B and the member 28B cooperates with the fibers F and serves to improve the structural strength of the hose construction 20B and in particular serves to prevent collapse of the hose due to negative pressure of kinking due to severe flexure. The strength member 28B may be made of any suitable metallic or non-metallic material and in this example of the invention is shown as being made of a metal wire which is also wound or arranged in a helical pattern concentrically around portion 23B and, although the wire 28B is shown wound at an angle θ of roughly 55° it may be wound at any suitable angle either greater or less than 55°

The hose construction 20C of FIG. 6 is shown with a plain inner layer portion 23C made of a suitable elastomeric material and an outer layer portion 24C bonded against the inner portion 23C as an integral part thereof with the portion 24C having elongated fibers F embedded therein in substantially parallel relation and with the fibers extending in a helical pattern about the axis 21C and with a predetermined angular relationship generally of the order of 55° relative thereto.

In each exemplary hose construction 20, 20A, 20B and 20C disclosed herein reference is made to an inner layer portion and an outer layer portion such as 23 and 24 respectively of hose construction 20. These portions in each hose construction 20 and 20A – 20C are not separable but are a unitary single-piece mass. It is obvious that they have been described as layer portions to emphasize the detailed construction thereof. In addition, it will be noted that ribbon-like strips have been shown by dot-dash lines in the drawings. Obviously, these are not lines or actual junction locations. These dot-dash lines emphasize that the associated layer portion was initially made by a method employing an elastomeric ribbon having parallel fibers therein as will be described later.

Having described the various embodiments of the hose construction of this invention in the form of hose constructions 20, 20A, 20B and 20C, the detailed description will now proceed with the improved method of this invention which may be employed to make each of these hose constructions. In particular, certain method steps are fully applicable to all hose constructions and will now be described briefly in connection with FIG. 7. Accordingly, the steps comprise placing, as shown at 30, an uncured inner layer portion on an associated mandrel, which may be either a solid or tubular mandrel, having a right circular cylindrical outside surface. An elongated ribbon of uncured elastomeric matrix material is provided, see the block shown at 31, which has elongated reinforcing fibers parallel the elongated dimension of the ribbon and the fibers are suitably provided in parallel relation and embedded in the material using any suitable technique known in the art. The uncured elongated ribbon is then wrapped, as shown by the block at 32, in a helical pattern against the inner layer portion (regardless of whether the inner layer portion is 23 of the hose construction 20, 23A of 20A, 23B of 20B, or 23C of 20C) with the ribbon and fibers extending in a helical pattern about a central longitudinal axis, and at an angle $\theta$ relative thereto, of the inner layer portion to define an assembly. The assembly is then suitably cured, as shown by the block at 33, to thereby simultaneously bond the layers together as a unit and define a hose construction. The curing may be achieved using any suitable technique known in the art and in one application of this invention, steam curing was employed and after curing the completed hose construction was suitably cooled and stripped from the mandrel in accordance with well-known techniques.

Figure 7:
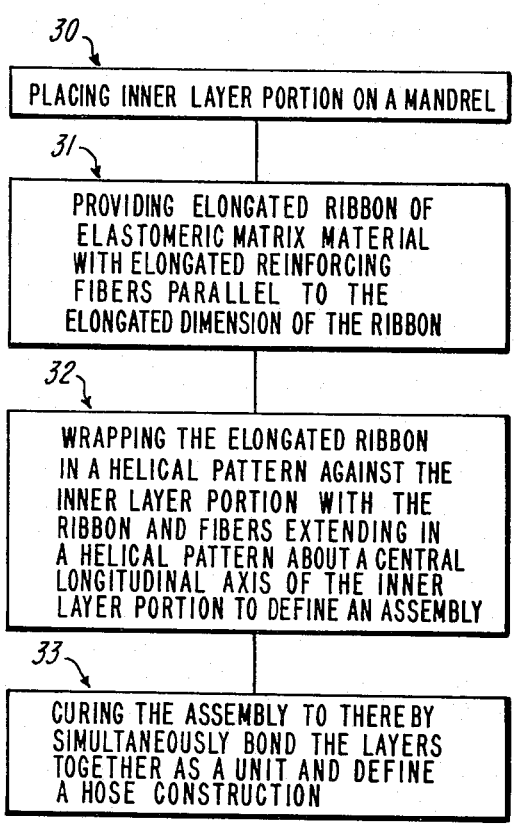
FIG. 7 is a block presentation of the method of this invention which may be employed to make the various hose constructions illustrated and described herein.

Having described the method of this invention in connection with FIG. 7 of the drawings, the detailed presentation will now proceed with particular emphasis on any method steps which are varied in order to produce the various hose constructions 10, 10A, 10B or 10C.

Figure 8:
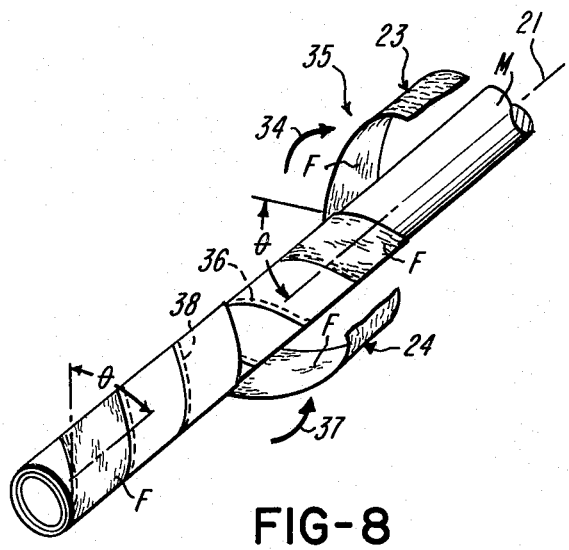
FIG. 8 illustrates a special method step which comprises the method steps of FIG. 7 and is employed to make the hose construction of FIG. 3.

In particular, it will be seen from FIG. 8 that in making the hose construction 20 the step of placing an inner layer 23 on a mandrel M comprises the steps of providing an uncured elongated ribbon, also designated by the reference numeral 23, of elastomeric matrix material having elongated reinforcing fibers F embedded therein substantially parallel to its elongated dimension. The ribbon 23 is then wrapped in one sense or direction, i.e., clockwise as shown at 34 and as viewed from the left end of FIG. 8, in a helical pattern against the mandrel M whereby the ribbon and its fibers F extend in a clockwise helical pattern about the axis 21 and with a predetermined angular relationship or angle $\theta$ generally of the order of 55° relative to the central longitudinal axis of the inner layer which is also the central axis of the mandrel to define the inner layer 23. The winding or wrapping action is achieved as shown at 35 and is illustrated in the drawings with adjoining turns of the ribbon 23 in slight overlapping relation as shown at 36 and the winding is achieved, as mentioned above, so that the fibers F extend at a right hand helix angle $\theta$ for the inner layer 23 as illustrated in the completed hose construction 20 of FIG. 3.

After layer or ribbon 23 has been placed on the mandrel M, another ribbon or uncured outer ribbon 24 is wound in an opposite sense or helical pattern against layer 23 whereby layer 24 is wound counterclockwise as viewed from the left end of FIG. 8 and as shown at 37. As previously described in connection with the ribbon 23, the ribbon 24 and fibers F extend in a helical pattern about the axis and with a predetermined angular relationship or angle $\theta$ relative to the central axis to define the uncured assembly of the block shown at 32 in FIG. 7. The winding of ribbon 24 is achieved with a slight overlap as shown at 38.

In presenting the winding of ribbons 23 and 24 to define hose construction 20 each ribbon has been wound with a slight overlap as shown at 36 and 38 in FIG. 8. However, it will be appreciated such ribbons may be wound with associated edges in abutting relation without an overlap. Further, once the assembly is cured the overlapped portions essentially smooth out and flow together as a unitary mass.

Figure 9:
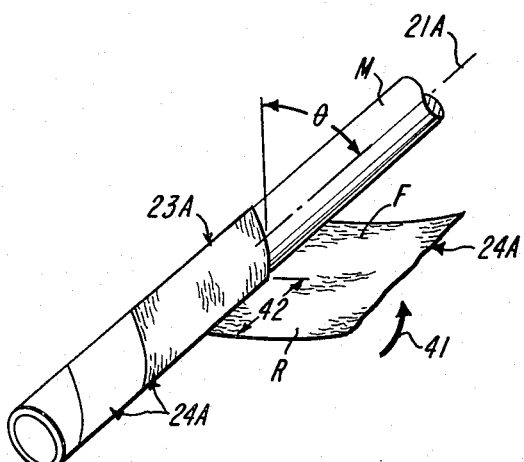
FIG. 9 illustrates a special method step which comprises the method steps of FIG. 7 and is employed to make the hose construction of FIG. 4.

The variation in the method steps of FIG. 7 used to define the hose construction 20A is illustrated by method steps in FIG. 9 wherein the placing and wrapping steps described in FIG. 7 and illustrated by the blocks 30 and 32 respectively are achieved in one counterclockwise wrapping action shown at 41 by wrapping an elongated uncured double width ribbon R about the mandrel M so that the last one of each turn adjoins and overlaps a preceding turn by an approximately 50 percent overlap as shown at 42 in FIG. 9, whereupon the inner layer portion 23A is defined and the outer layer portion 24A of the hose construction 20A is simultaneously defined. It will also be seen that the ribbon R and all fibers F of the layers 23A and 24A extend in the same helical sense or direction and at the same helix angle $\theta$ of roughly 55°.

The main variation of the method steps of FIG. 7 used to define the hose construction 20B consists, in essence, of first wrapping the elongated ribbon similar to ribbon 23 about the mandrel M in the manner described in connection with FIG. 8, then wrapping the inextensible elongated strength member 28B made of metallic wire and in a helical pattern against the first-wrapped ribbon whereupon the outer ribbon similar to ribbon 24 is wrapped in position. The strength member 28B is also wrapped at an angle $\theta$ of roughly 55 percent relative to the axis of the assembly defined by the wrapped ribbons.

Figure 10:
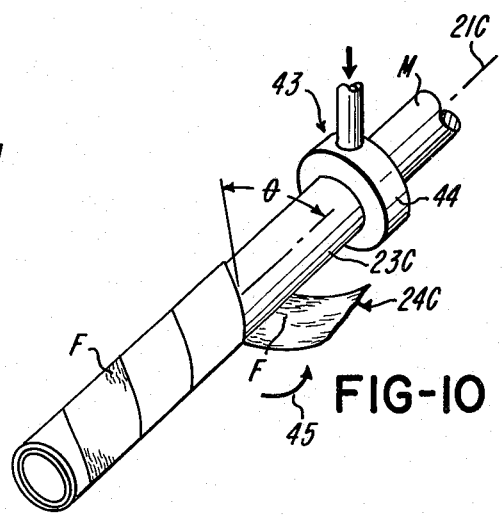
FIG. 10 illustrates a special method step which comprises the method steps of FIG. 7 and is employed to make the hose construction of FIG. 6.

The variation in the method steps utilized to define the hose construction 20C consists in placing an uncured plain seamless sleeve-like member 23C which defines the inner layer 23C on the mandrel M. This placement is achieved by using a well known extruding apparatus 43 having a head 44 as shown in FIG. 10. After sleeve-like portion 23C is in position an outer ribbon 24C is suitably wound in a counterclockwise manner as shown at 45 with the ribbon 24C and its fibers F being at an angle $\theta$ relative to the axis of the sleeve 23C and mandrel M.

The fibers F which are utilized in the various hose constructions and in the ribbons used to make such hose constructions may be made of any suitable material. Especially good results have been obtained using wood cellulose fibers manufactured by the Monsanto Company of St. Louis, Missouri, and identified at "D-871." These fibers have an elastic modulus of 2 to 5 × $10^6$ psi and a tensile strength of 6 to 9 × $10^4$ psi with an average diameter of 8 to 16 microns and a length of 1 to 3 millimeters. These fibers are suitably treated in accordance with techniques which are well known in the art to promote bonding thereof in the elastomeric matrix.

In this disclosure of the invention, the various hose constructions have been illustrated and described as straight or rectilinear hose constructions with plain uncorrugated walls. However, it will be appreciated that the principles of this invention may be utilized to provide hose constructions having non-rectilinear configurations whereby curved mandrels, or the like, may be employed in the curing stage. In addition, corrugated elastomeric hose constructions may be provided using fixed or moving mold means and suitable vacuum and/or pressure equipment.

In this disclosure of the invention the various hose constructions have been illustrated and described as being made of various portions which are made of elastomeric matrix material having fibers F embedded therein. It will be appreciated that any suitable elastomeric materials may be employed, including natural and synthetic rubber compounds, as well as suitable plastic materials.

In this disclosure of the invention the hose construction 20A is shown with an inner layer portion 23A and a layer portion 24A each having fibers F extending so that the fibers of each layer are arranged in strands S of the character previously defined and all of the strands S extend at substantially the same helix angle relative to the longitudinal axis 21A. However, it is to be understood that the hose construction 20A may, in many applications, also have another pair of layer portions similar to the layer portions 23A and 24A wound at the same helix angle $\theta$ relative to the longitudinal axis 21A while being wound in an opposite sense, whereby such a hose construction would in essence have four layer portions defined by the layer portions 23A and 24A as shown plus another pair of layer portions similar to layer portions 23A and 24A which are similarly defined and wound in an opposite sense.

The hose construction 20C is shown in the drawings as a plain inner layer portion 23C; however, it is to be understood that such inner layer portion may be a conventionally defined inner layer portion made using any suitable technique known in the art with reinforcing means (not shown) therein of any presently known construction. In addition, the inner layer portion 23C may be made using an extruding apparatus 43 as illustrated in FIG. 10 with the flowable elastomeric material being extruded through such apparatus having reinforcing means similar to the fibers F dispersed therein in an embedded manner so that upon extrusion of the elastomeric material to define the inner layer portion 23C the fibers are extruded in position and provide reinforcing means for layer portion 23C simultaneously with the forming of such layer portion.

Each of the hose constructions 20, 20A, 20B, and 20C may be provided with an additional inexpensive outer cover in accordance with techniques which are well known in the art. Similarly, each of these hose constructions may be provided with an inner liner which may be for a special purpose, such as resistance to chemical corrosion, for example, or such inner liner may be of a comparatively inexpensive material and with a wall thickness which is much smaller than would normally be provided for an inner layer portion and for the purpose of assuring that the hose construction is free of pin-hole leaks, or the like.

While present exemplary embodiments of this invention and methods of practicing the same have been illustrated and described, it will be recognized that this invention may be otherwise variously embodied and practiced within the scope of the following claims.

What is claimed is:

1. A hose construction having a reference axis and comprising an inner layer portion made primarily of an elastomeric material and another layer portion bonded against said inner layer portion and cured therewith as an integral part thereof, said other layer portion being made of an elastomeric matrix compound having randomly distributed elongated fibers embedded therein in substantially parallel relation, said fibers extending in a helical pattern about said axis at a predetermined angular relationship relative thereto, said fibers providing reinforcement for said hose construction.

2. A hose construction as set forth in claim 1 in which said layer portions are of approximately equal thickness and said inner layer portion also has parallel fibers therein, with said fibers in each layer portion extending in the same helical pattern and at substantially the same angular relationship with said reference axis.

3. A hose construction as set forth in claim 1 in which said predetermined angular relationship ranges between 50° and 60°.

4. A hose construction as set forth in claim 1 in which said inner layer portion is also made of an elastomeric matrix compound having randomly distributed elongated fibers embedded therein in substantially parallel relation, said fibers of said inner layer portion also extending in a helical pattern about said axis with a predetermined angular relationship relative thereto, said helical pattern of the fibers of said inner layer portion extending in a direction opposite from the helical pattern of said other layer portion, said fibers serving as the main reinforcement means for said hose construction.

5. A hose construction as set forth in claim 4 in which said predetermined angular relationship of said fibers of said inner layer portion ranges between 50 and 60°.

6. A hose construction as set forth in claim 4 in which each of said fibers has a length of three millimeters and less.

7. A hose construction as set forth in claim 4 and further comprising an inextensible elongated strength member bonded between said layer portions, said strength members serving to improve the structural strength of said hose construction.

8. A hose construction as set forth in claim 7 in which said inextensible elongated member is in the form of a metal wire.

9. A hose construction as set forth in claim 4 in which said inner layer portion and said other layer portion are made of different elastomeric compositions which are compatible with each other and are particularly adapted to be bonded together.

10. A hose construction as set forth in claim 9 in which said inner layer portion is made of nitrile butadiene rubber and said other layer portion is made of an ethylene propylene terpolymer.

11. A hose construction as set forth in claim 4 in which said fibers are wood-cellulose fibers having an elastic modulus of 2 to $5 \times 10^6$ psi and a tensile strength of 6 to $9 \times 10^4$ psi.

12. A hose construction as set forth in claim 4 in which said fibers provide their associated layer portions with a high Young's modulus and mechanical anisotrophy.

13. A hose construction as set forth in claim 4 in which said fibers have a tensile modulus in the direction of fiber orientation which is much higher than in a direction transverse the direction of fiber orientation.

* * * * *